United States Patent
Okamoto et al.

(10) Patent No.: US 8,205,267 B2
(45) Date of Patent: Jun. 19, 2012

(54) DISPLAY SYSTEM AND IMAGE PROCESSING APPARATUS

(75) Inventors: Yuji Okamoto, Kyoto (JP); Naofumi Ueda, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 982 days.

(21) Appl. No.: 12/150,253

(22) Filed: Apr. 24, 2008

(65) Prior Publication Data

US 2008/0266467 A1 Oct. 30, 2008

(30) Foreign Application Priority Data

Apr. 26, 2007 (JP) .................................. 2007-116893

(51) Int. Cl.
G06F 17/30 (2006.01)
(52) U.S. Cl. .......................... 726/27; 348/739
(58) Field of Classification Search ................ 726/4, 17, 726/21, 27–30; 348/739
See application file for complete search history.

(56) References Cited

U.S. PATENT DOCUMENTS

| | | | | |
|---|---|---|---|---|
| 6,111,504 A * | 8/2000 | Packard et al. | ............. | 340/568.1 |
| 2001/0012114 A1* | 8/2001 | Ozaki | ........................ | 358/1.12 |
| 2004/0015729 A1* | 1/2004 | Elms et al. | ..................... | 713/201 |
| 2004/0187022 A1 | 9/2004 | Asada et al. | | |
| 2005/0248543 A1* | 11/2005 | North et al. | .................... | 345/173 |
| 2006/0075487 A1* | 4/2006 | Pfleging et al. | ................. | 726/21 |
| 2006/0209362 A1 | 9/2006 | Suenaga et al. | | |
| 2006/0245004 A1* | 11/2006 | Okamoto et al. | ............. | 358/448 |
| 2007/0076251 A1 | 4/2007 | Yasuda | | |
| 2007/0183493 A1* | 8/2007 | Kimpe | ....................... | 375/240.1 |
| 2009/0015861 A1 | 1/2009 | Ohta et al. | | |

FOREIGN PATENT DOCUMENTS

| | | |
|---|---|---|
| JP | 2002-300191 | 10/2002 |
| JP | 2004-234241 | 8/2004 |
| JP | 2005-026876 | 1/2005 |
| JP | 2006-013627 | 1/2006 |
| JP | 2006-254222 | 9/2006 |
| JP | 2007-019928 | 1/2007 |
| JP | 2007-097052 | 4/2007 |
| WO | WO-2006/109447 A1 | 10/2006 |

\* cited by examiner

*Primary Examiner* — Beemnet Dada
(74) *Attorney, Agent, or Firm* — Edwards Wildman Palmer LLP; David G. Conlin; David A. Tucker (57) ABSTRACT

When an image processing apparatus outputs an image to a display apparatus, the image processing apparatus confirms display conditions on the designated display apparatus. After the confirmation, the image processing apparatus reads an image of a document according to the display conditions. The image to be outputted is a different image from an original image, i.e., the image to be outputted is restricted. The image processing apparatus transmits the restricted image to the display apparatus. The display apparatus displays the restricted image differing from the original image. By restricting the image to be displayed depending on the display apparatus, the security can be improved and leakage of confidential information can be prevented.

5 Claims, 7 Drawing Sheets

| INSTALLATION LOCATION | CHARACTERISTICS OF DISPLAY APPARATUS | IMAGE DISPLAY CONDITIONS | WHETHER TO ALLOW ENLARGED DISPLAY | SECURITY LEVEL |
|---|---|---|---|---|
| CONFERENCE ROOM 1 | COLOR 1200dpi 65inch | COLOR 300dpi TRANSMISSION ALLOWED | ENLARGED DISPLAY ALLOWED | 3 |
| CONFERENCE ROOM 2 | FULLCOLOR 1200dpi 46inch | COLOR 600dpi TRANSMISSION ALLOWED | ENLARGED DISPLAY ALLOWED | 3 |
| CONFERENCE ROOM 3 | MONOCHROME 600dpi 20inch | MONOCHROME 300dpi TRANSMISSION ALLOWED | ENLARGED DISPLAY NOT ALLOWED | 2 |
| RECEPTION ROOM 1 | FULLCOLOR 600dpi 37inch | FULLCOLOR 300dpi TRANSMISSION NOT ALLOWED | ENLARGED DISPLAY NOT ALLOWED | 3 |
| RECEPTION ROOM 2 | COLOR 1200dpi 65inch | COLOR 600dpi TRANSMISSION ALLOWED | ENLARGED DISPLAY ALLOWED | 2 |
| BUSINESS NEGOTIATION ROOM | COLOR 600dpi 20inch | COLOR 150dpi TRANSMISSION ALLOWED | ENLARGED DISPLAY ALLOWED | 1 |

DISPLAY SYSTEM AND IMAGE PROCESSING APPARATUS

BACKGROUND OF THE INVENTION

1. Field of the Invention

The present invention relates to a display system in which a display apparatus displays an image outputted from an image processing apparatus.

2. Description of the Related Art

A display system is formed in which an image processing apparatus such as a composite machine and a display apparatus are connected through a network. The display apparatus displays an image outputted from the image processing apparatus. The image processing apparatus reads an image of a document using a scanner, or stores and files an image outputted from a PC. Then, the image processing apparatus can output the inputted image to the outside through the network. As disclosed in Japanese Patent Laid-Open No. 2007-97052, when an image processing apparatus outputs a read image to a display apparatus, the display apparatus can display the inputted image in real time.

The display apparatus, which is installed on a different location from the image processing apparatus, displays the image outputted from the image processing apparatus. Consequently, a third party can view the image on the display apparatus. In some cases, however, an image may have confidential information. If a third party views such an image, the confidential information might be leaked.

That is, from the viewpoint to prevent leakage of confidential information, an image to be displayed needs to be restricted depending on an installation location of the display apparatus. Therefore, in the light of the above, it is an object of the present invention to provide a display system that can improve the security and prevent leakage of confidential information.

SUMMARY OF THE INVENTION

The present invention provides a display system wherein image processing apparatuses for processing images and display apparatuses for displaying images are connected through a network, the display apparatuses display images outputted from the image processing apparatuses, the image processing apparatuses restrict images to be outputted according to display conditions determined for the display apparatuses, and the display apparatuses display the restricted images.

The display apparatuses display the restricted images so that the original images are not displayed without a change. Therefore, when an image containing confidential information is displayed, the image can be displayed in the state in that the confidential information is not apparent, thus disabling visual recognition of the confidential information.

The display conditions are determined depending on the display apparatuses. The display apparatuses differ from one another in the display abilities and installation locations. When a display apparatus is installed on a predetermined location, the display conditions are determined depending on the installation location. Then, a security level is set for the installation location, and the display conditions are determined depending on the security level. That is, a user who watches the display apparatus can be limited based on an installation location, so that a security level can be set depending on the installation location. Accordingly, display conditions are determined such that an image to be outputted is strictly restricted for a lower security level and an image to be outputted is loosely restricted for a higher security level.

The plurality of display apparatuses are installed on different locations, and the image processing apparatuses output images restricted for each of the display apparatuses. Different installation locations involve different security levels and different display conditions. As such, an image suitable for an installation location is outputted, and a high-security image can be displayed for a purpose of using each display apparatus.

The plurality of image processing apparatuses are connected to the network, and a particular one of the image processing apparatuses manages the display conditions on the plurality of display apparatuses. This allows the particular one of the image processing apparatuses to manage the display conditions on the plurality of display apparatuses in an integrated fashion.

The image processing apparatuses output images that have been edited so as to be different from original images according to the display conditions, and the display apparatuses display the edited images. The edited images, which have a less image quality, for example, than the original images, are different from the original images. As such, it is difficult to visually recognize an image for confidential information, thus preventing recognition of the confidential information.

The image processing apparatuses judge whether to allow output of images based on the display conditions. If the output is not allowed, the apparatuses prohibit the image output. By prohibiting the image output, the images to be outputted can be restricted. If the output is allowed, the apparatuses can edit and output the images.

The display conditions include whether to allow an enlarged image. If an image that is allowed to be enlarged is inputted, the display apparatuses enlarge and display the image. When the enlarged image is displayed, a fine image can be visually recognized. Accordingly, by not allowing an enlarged image, a restricted image is displayed.

Each of the above image processing apparatus comprises a control section for restricting an image to be outputted according to the display conditions determined for each display apparatus. The control section outputs the restricted image to the display apparatus.

The control section also edits the image so as to be a different image from an original image according to the display conditions. The control section further judges whether to allow output of the image based on the display conditions. If the output is not allowed, the control section prohibits the image output.

According to the present invention, by restricting an image to be outputted to the display apparatus, even an image containing confidential information is displayed as a different image from an original image. This can make an image for the confidential information unclear, prevent leakage of the confidential information, and construct a high-security display system.

DETAILED DESCRIPTION OF THE PREFERRED EMBODIMENTS

Figure 1:
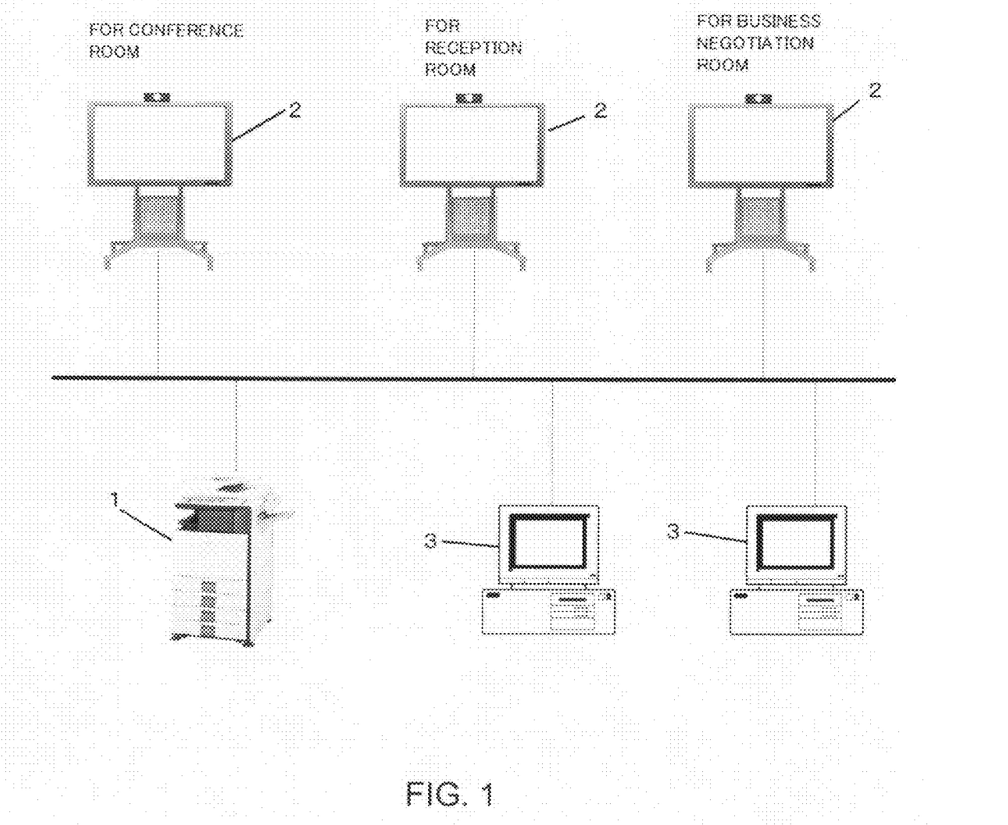
FIG. 1 is a diagram of the overall configuration of a display system according to the present invention.

FIG. 1 shows a display system according to this embodiment. The display system comprises one or more image processing apparatuses 1, display apparatuses 2 and information processing apparatuses 3, which are connected through a network so that they can communicate with one another. The image processing apparatus 1 is a composite machine for executing copy, print, scan, facsimile communication and document filing. The information processing apparatus 3, which is a PC or a server, processes an image such as creates an image or stores an image. That is, the information processing apparatus 3 is also one of the image processing apparatuses 1. The display apparatus 2 is a business-oriented display, i.e., a so-called information display.

Figure 2:
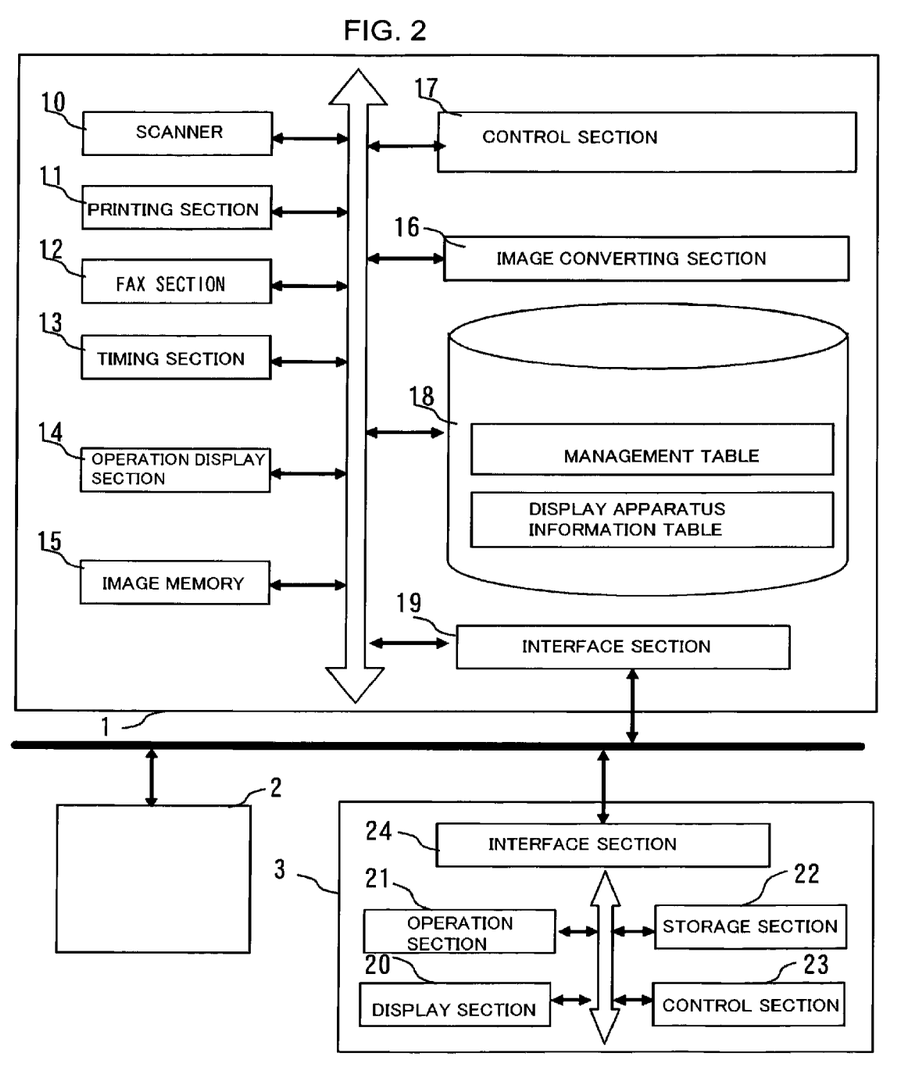
FIG. 2 is a block diagram showing the internal configurations of an image processing apparatus and an information processing apparatus.

As shown in FIG. 2, the image processing apparatus 1 includes a scanner 10 for reading an image of a document, a printing section 11 for printing an inputted image, a FAX section 12 for transmitting the inputted image to a designated transmission destination, a timing section 13 for timing a date and time, and a touch-sensitive panel display section. The apparatus further comprises an operation display section 14 for a user to input operation, an image memory 15 for temporarily storing an image such as a RAM, an image converting section 16 for converting an image and transmitting the image, a control section 17 for conducting control of operation on the entire apparatus, a storage section 18 for storing an image and various setting information, and an interface section 19 for communicating with external apparatuses such as the information processing apparatuses 3 and the display apparatuses 2 via the network.

The information processing apparatus 3 comprises a display section 20 for displaying an image, an operation section 21 for a user to input operation, a storage section 22 for storing an image, a control section 23 for executing processing on an image, and an interface section 24 for communicating with external apparatuses such as the image processing apparatuses 1 and the display apparatuses 2 via the network.

Figure 3:
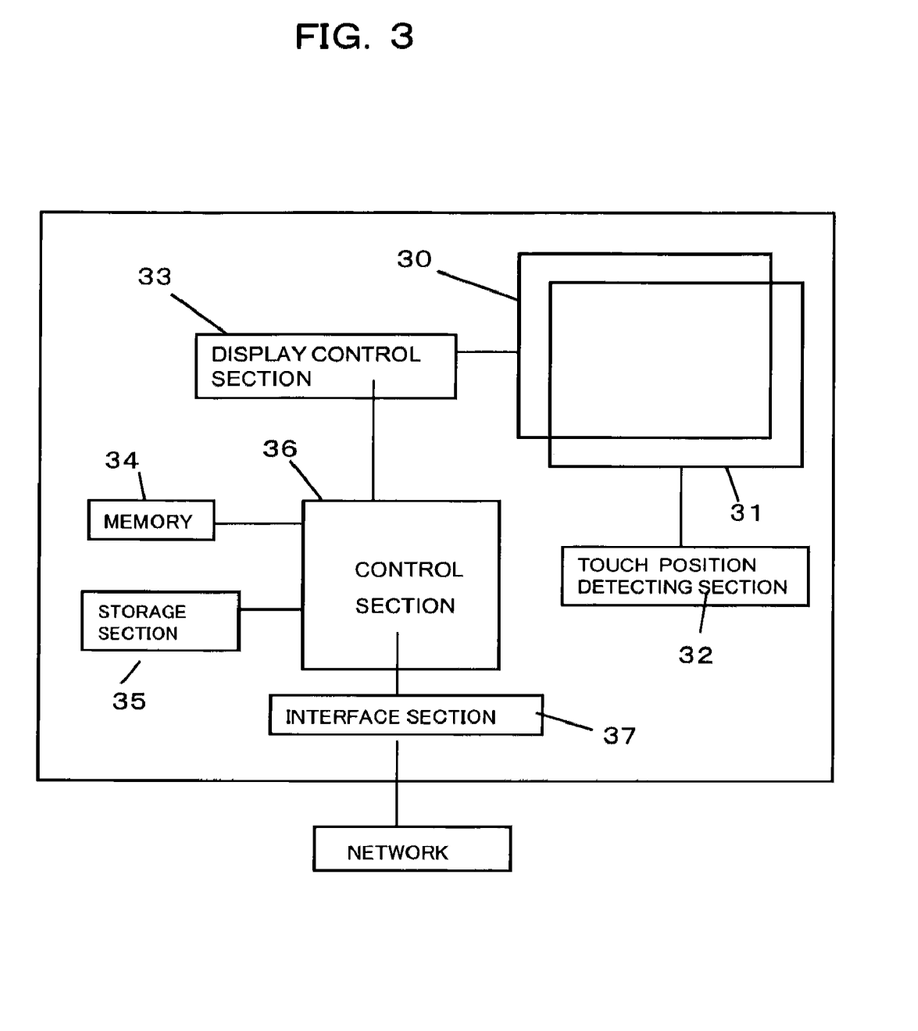
FIG. 3 is a block diagram showing the internal configuration of the display apparatus.

As shown in FIG. 3, the display apparatus 2 comprises a display panel 30 such as an LCD display, a touch panel 31 provided in the front of the display panel 30, a touch position detecting section 32 for detecting a coordinate position on the touch panel 31, a display control section 33 for outputting a display timing signal to the display panel 30, a memory 34, such as a ROM or a non-volatile memory, for storing information of an icon to be displayed on the display panel 30, a storage section 35 for storing an image such as a hard disk apparatus or a non-volatile memory, a controlling section 36 for control display of an image, and an interface section 37 for communicating with external apparatuses such as the image processing apparatuses 1 and the information processing apparatuses 3 via the network. As illustrated, the display apparatus 2 is embedded with functions similar to those of the information processing apparatus 3.

The display panel 30 has an anisotropic-permittivity LCD layer between two substrates. An image is displayed by adjusting the light quantity from back light that transmits the substrates depending on the intensity of an electrical field applied to the LCD layer.

In the front of the display panel 30, a parallax barrier (optical separation element) is superimposed all over the panel 30. A parallax barrier is a slit having a plurality of vertical translucent slits divided by an opaque region. A parallax barrier is provided so that dual-view display is possible. That is, the display control section 33 drives neighboring pixels on the display panel 30 depending on different images. The images corresponding to different view points are displayed on the same display screen. This allows a viewer who views from different directions to visually recognize different images. The display apparatus 2 does not always need to have the dual-view display function, so that proving the parallax barrier is not a requisition.

The touch panel 31 is an electrostatic capacitance binding panel that is formed of a transparent material not to inhibit display on the display panel 30. When a conductor such as a finger approaches a transparent electrode of the touch panel 31, electrostatic capacitance binding occurs and an electric current flows. The touch position detecting section 32 detects the electric current, calculates coordinates of a position approached by the conductor, and transmits a detection signal to the control section 36. This allows the controlling section 36 to recognize information of the position touched by a user. A system for the touch panel 31 can include other systems such as electromagnetic guidance, electric resistance or pressure sensitivity.

The memory 34 stores data on a plurality of icons. The icon data contains a shape, a color and a display position of an icon, display information such as of characters displayed in the icon, and operation information to identify operation content when the icon is selected through the touch panel 30.

The control section 36 combines an image inputted from the image processing apparatus 1 or the information processing apparatus 3 with an icon read out from the memory 34 and outputs the result to the display control section 33. The display control section 33 outputs the combined image to the display panel 30. The section 33 outputs a control signal, together with the image, to control display operation on the display panel 30. Specifically, the display control section 33 drives a gate driver and a source driver based on an image to be displayed. The gate driver applies operational power voltage to drive a plurality of pixels of the display panel 30. The source driver applies writing voltage to drive a plurality of pixels. The respective pixels of the display panel 30 are driven based on the control signal from the display control section 33 so that the display panel 30 displays the image.

In the display system according to the present invention, a plurality of the display apparatuses 2 are installed on different locations. The image processing apparatus 1 and the information processing apparatus 3 are installed on the same location as or a different location from the display apparatuses 2. An installation location of the display apparatus 2 can be a conference room, a reception room, a business negotiation room or the like.

The image processing apparatus 1, the information processing apparatus 3 and the display apparatus 2 installed on pre-determined locations are connected to one another via a network such as a LAN or a WAN. Instead of a wired LAN using a LAN cable or a power line, a wireless LAN can be used. The interface section of each apparatus communicates with external apparatuses according to a pre-determined communication protocol. The network is connected to the Internet via a communication line such as a telephone line or an optical fiber through a rooter. The FAX section 12 of the image processing apparatus 1 includes a modem, which is connected to the telephone line. The FAX section 12 performs facsimile communication with a facsimile apparatus and the other image processing apparatuses 1 through the modem.

In the information processing apparatus 3, the control section 23 runs an application to store an image generated based on user input. Alternatively, it stores an image obtained through the Internet. Then, the controlling section 23 outputs the image to the image processing apparatus 1 or the display apparatus 2.

In the image processing apparatus 1, the scanner 10 reads an image to input the image. The scanner 10 also receives an image from the information processing apparatus 3 to input the image. The control section 17 processes the inputted image according to an instruction from a user or the information processing apparatus 3. For example, for copy or print, the printing section 11 is manipulated to print the image. In facsimile communication, the FAX section 12 is manipulated to receive the image. In document filing, the image is stored in the storage section 18 such as a hard disk apparatus.

The image processing apparatus 1 outputs the inputted image or the stored image to the display apparatus 2. During the outputting, the image converting section 16 converts the image to a pre-determined data format such as JPEG. The converted image is outputted to the display apparatus 2. The information processing apparatus 3 outputs the image to the display apparatus 2 as well.

The display apparatus 2 displays the image outputted from the image processing apparatus 1 or the information processing apparatus 3 along with an icon. Then, a user performs operation through the touch panel 31, so that display control such as modification is performed on the displayed image and the modified image is outputted to the image processing apparatus 1 or the information processing apparatus 3.

That is, when the user touches the icon, the controlling section 36 of the display apparatus 2 judges the relation between position information from the touch position detecting section 32 and display information of the displayed icon. The control section 36 recognizes the user-selected icon and executes processing such as to move, transform or switch the image based on operation information of the icon. The processed image is stored in the storage section 35. The controlling section 36 outputs the processed image to the image processing apparatus 1 or the information processing apparatus 3 as necessary. This allows the user to easily perform operation on the displayed image. If an image is processed in each apparatus, and if the image is communicated through a network, it is handled as image data in a pre-determined data format.

In the above, the plurality of the display apparatuses 2 are in different installation locations such as a conference room, a reception room and a business negotiation room. In the respective rooms, a meeting, a conference and business negotiation are held. Users in each room watch a screen of the display apparatus 2 installed. A displayed image may contain confidential information. The users include people from the outside or outsiders. It is inconvenient if such users see an image containing the confidential information.

In view of the above, considering usage of each room, the image processing apparatus 1 restricts an image to be outputted to the display apparatus 2. The display apparatus 2 displays the restricted image. That is, the image processing apparatus 1 restricts an image to be outputted according to display conditions determined depending on the display apparatus 2.

The display conditions are determined depending on an installation location of the display apparatus 2. Specifically, when an installation location of the display apparatus 2 is fixed, an authorized user such as an administrator sets a security level depending on the installation location in the image processing apparatus 1 or the information processing apparatus 3, and determines the display conditions depending on the security level.

For example, a security level for a room such as a conference room used by an internal user is set to high, while a security level for a room such as a business negotiation room used by a foreign user is set to low. Display conditions are determined such that an image to be outputted is more strictly restricted for a lower security level and an image to be outputted is more loosely restricted for a higher security level. To decide display conditions, the display ability of the display apparatus 2 is referred to. Depending on the display ability including the resolution, the screen size or the number of colors, display conditions are determined not to exceed the display ability. For the highest security level, the display ability of the display apparatus 2 is display conditions so that an image to be outputted is not restricted.

Figure 4:
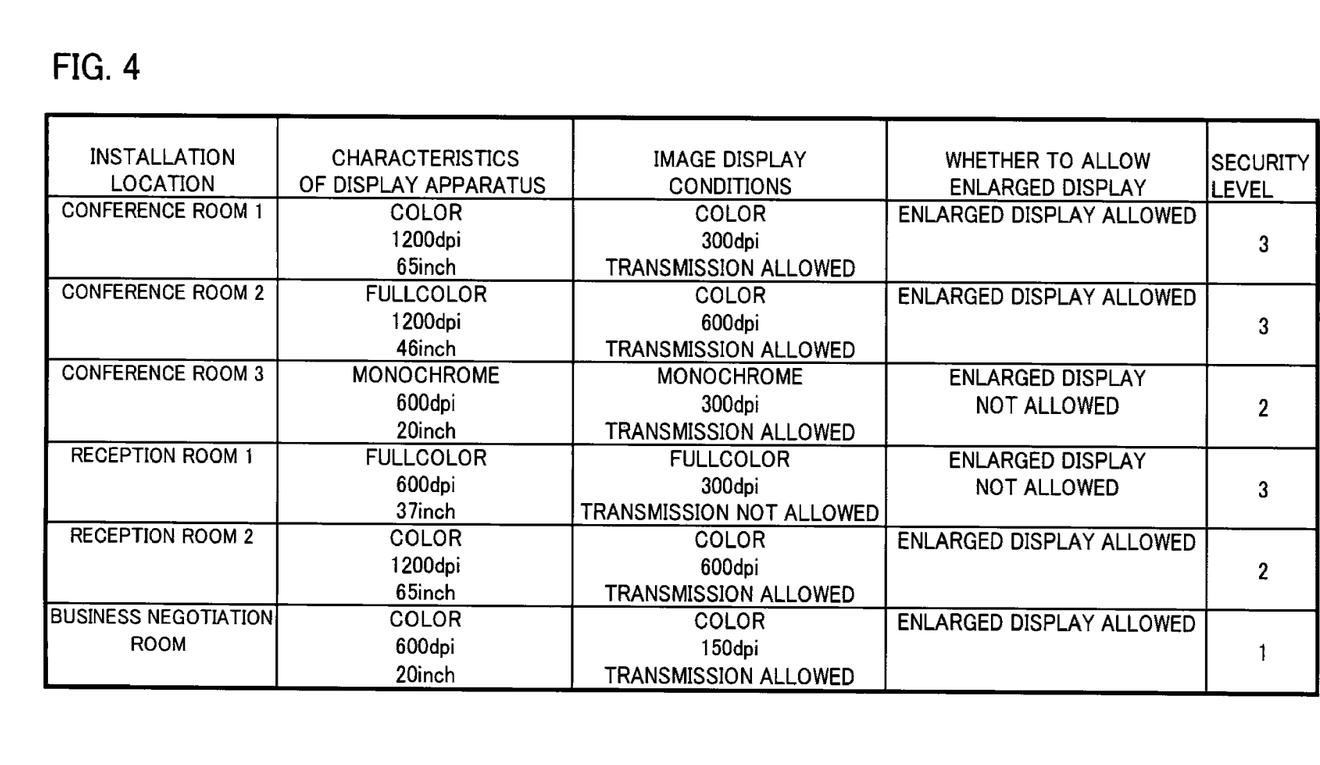
FIG. 4 is a diagram showing a table of display apparatus information.

Such setup display conditions and a security level are stored in the image processing apparatus 1 and the information processing apparatus 3. As shown in FIG. 4, a display apparatus information management table is created to register display apparatus information including an installation location, the display ability of the display apparatus 2, display conditions, whether to allow enlarged display and the security level. The display apparatus information table is stored in the storage sections 18 and 22 of the image processing apparatus 1 and the information processing apparatus 3. The image processing apparatus 1 and the information processing apparatus 3 retain the same display apparatus information table. If the display apparatus information is modified as the display apparatus 2 is moved or replaced, each display apparatus information table of the image processing apparatus 1 and the information processing apparatus 3 is updated.

The enlarged display in the display apparatus information is a function of the display apparatus 2 of enlarging and displaying an image. The display size or zoom magnification can be designated, and the control section 36 of the display apparatus 2 enlarges an image into the designated size. The display conditions include whether to allow enlarged display. If it is set to not to allow enlarged display, an image to be displayed is restricted.

When the image processing apparatus 1 outputs an image to the display apparatus 2, it restricts an image to be outputted to the display apparatus 2 according to determined display conditions. The display conditions are decided based on the display ability of the display apparatus 2 and depending on the security level. The image processing apparatus 1 edits an image so as to differ from the original image according to the display conditions. Then, the image converting section 16 converts the image to a data format to transmit the edited image, after that the control section 17 outputs the converted image.

The edit of an image includes edits such as to convert a color image to a monochrome image, reduce the resolution of an image, reduce the image size, lower the contrast of an image. The edit can also include a multi-page edit to arrange images of a plurality of pages on a single page for images over the plurality of pages, or an edit to transform an image such as to scale or rotate an image or reverse colors by using image processing functions of the image processing apparatus 1 and the information processing apparatus 3.

According to display conditions, one or more edits are selected from these edits. Then, the degree of a change due to an edit is determined depending on the security level. An image is edited such that the degree of a change from the original image is larger for a lower security level. For example, the image resolution is 150 dpi for a low security level, while the resolution is 600 dpi for a high security level. By performing such an edit, an image to be outputted can be restricted.

In the edit of an image, the control section 17 executes an edit according to display conditions on an image stored in the storage section 18 or an image inputted from the information processing apparatus 3. Meanwhile, for an image inputted from the scanner 10, the control section 17 sets reading conditions of the scanner 10 depending on display conditions and the scanner 10 reads an image according to the reading conditions. The image read by the scanner 10 is a different image from the original image, i.e., an edited image. In other words, the control section 17 restricted an image to be outputted even in the case of the image inputted from the scanner 10. In some cases, the control section 17 further edits a read image depending on display conditions.

Display conditions also include whether to allow image output. If image output is allowed (can be transmitted), the control section 17 permits outputting the image to the display apparatus 2. If image output is not allowed (cannot be transmitted), the controlling section 17 prohibits outputting the image. It is also determined whether to allow image output depending on the security level. In this way, outputting an image is restricted by prohibiting image output.

The above display conditions are determined by setting by a user such as an administrator. Instead, the control section 17 or 23 of the image processing apparatus 1 or the information processing apparatus 3 may automatically determine the display conditions when the security level for an installation location and the display ability of the display apparatus 2 are inputted.

The image processing apparatus 1 has a function of authenticating a user. User authentication information such as an ID and a password is registered and stored in a management table of the storage section 18. The management table also stores a security level set for an inputted image.

Figure 5:
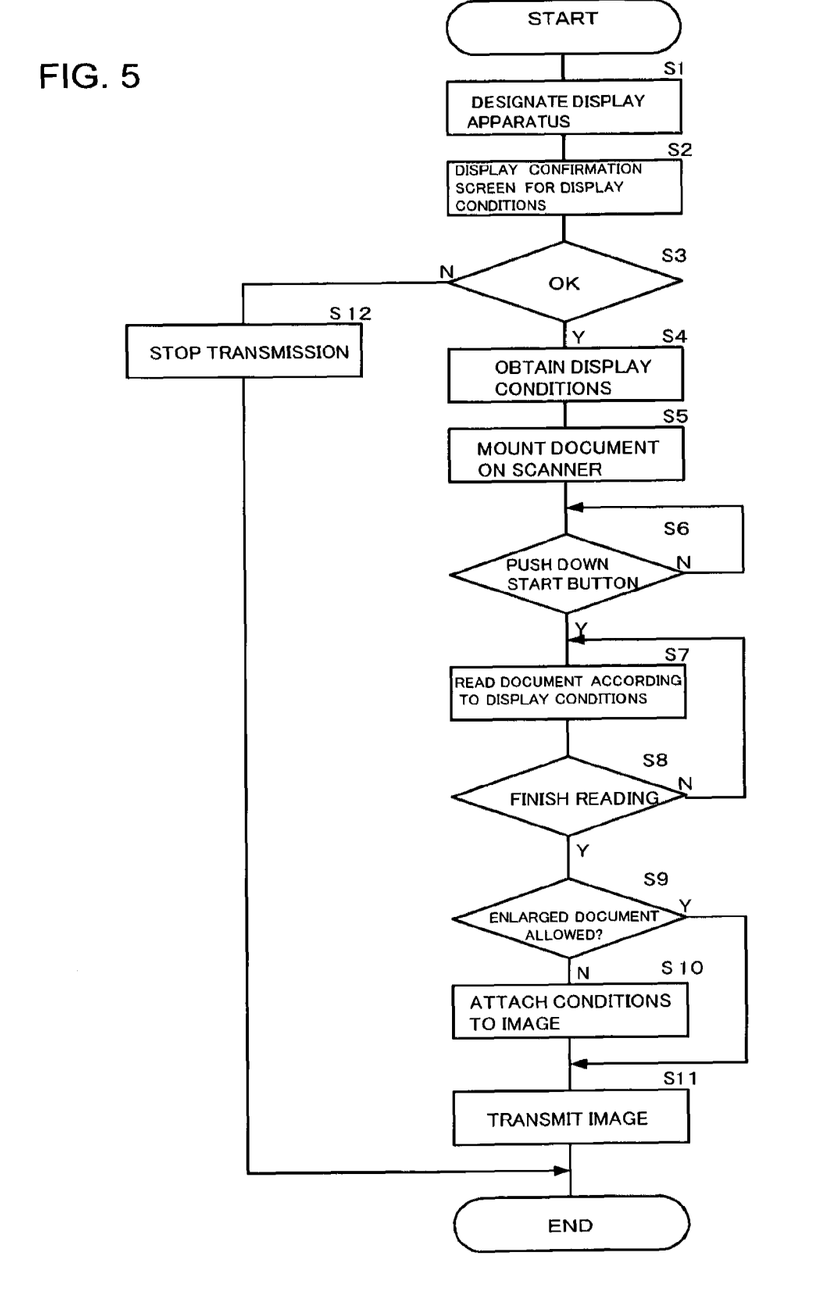
FIG. 5 is a flowchart to output a restricted image.
Figure 6:
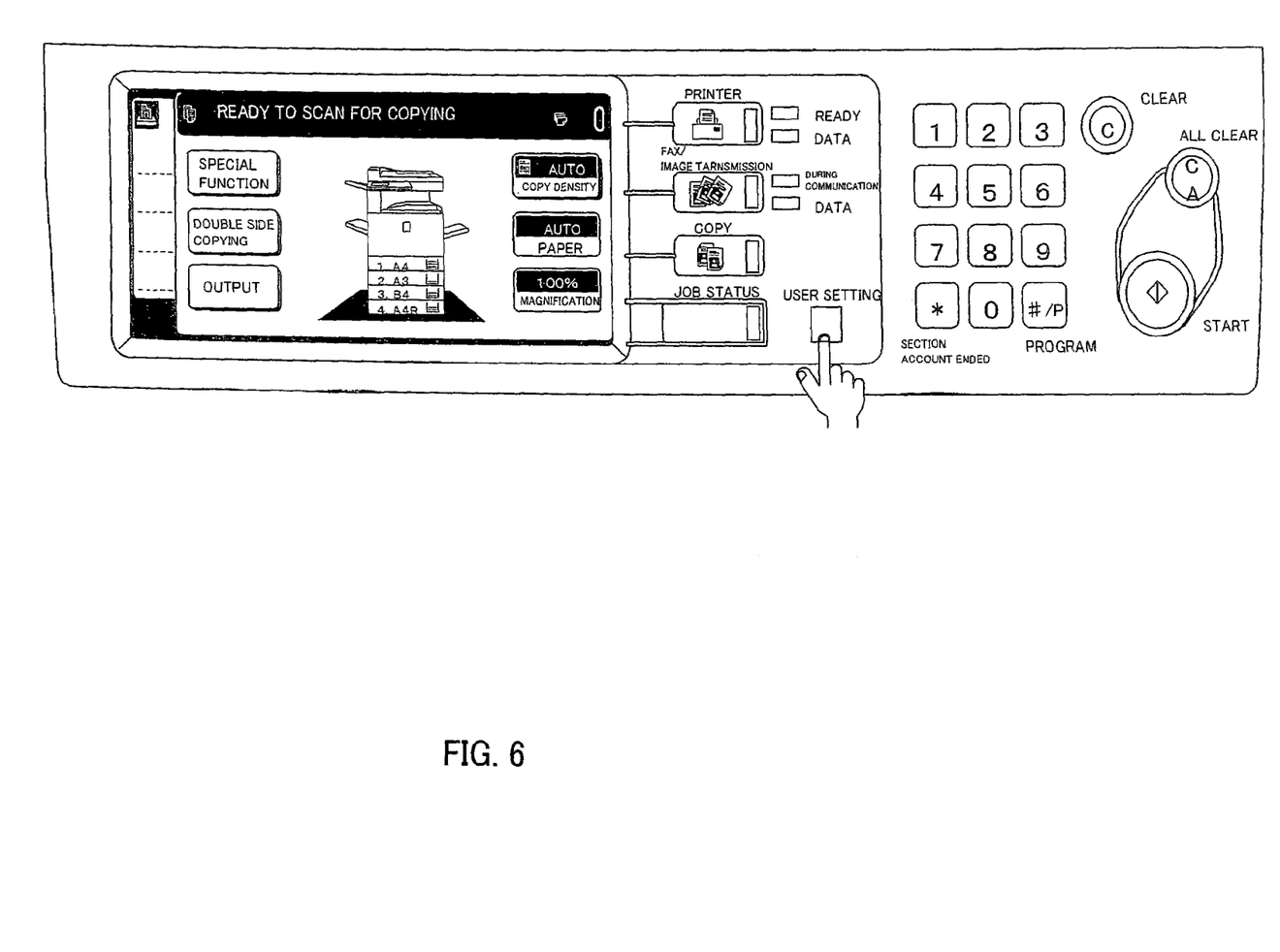
FIG. 6 is a diagram showing an operation panel.
Figure 7:
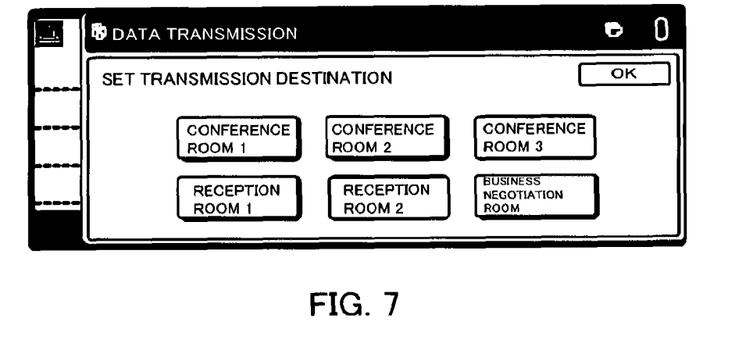
FIG. 7 is a diagram showing a transmission destination setting screen.
Figure 8:
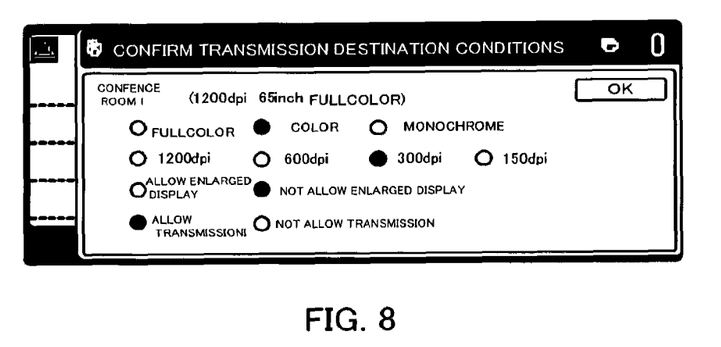
FIG. 8 is a diagram showing a confirmation screen for display conditions.

Next, a procedure when the display apparatus 2 displays an image will be described with reference to FIG. 5. First, a user designates the display apparatus 2 to display an image. The user manipulates a user setting key in an operation panel of the image processing apparatus 1 shown in FIG. 6. A transmission destination setting screen to designate the display apparatus 2 shown in FIG. 7 is displayed in the operation display section 14 in the operation panel. Herein, the user designates an installation location of the desired display apparatus 2 (S1). The control section 17 reads out display apparatus information of the designated installation location from the display apparatus information table, and displays a confirmation screen for display conditions in the operation display section 14 (S2), as shown in FIG. 8. The screen of the operation display section 14 displays the installation location, the display ability and display conditions of the display apparatus 2.

The user confirms the display conditions. If the display conditions have no problem, the user manipulates an OK button on the screen (S3). The controlling section 17 obtains the display conditions from the storage section 18 and temporarily stores the conditions in the image memory 15 (S4). If the display conditions have any problem, the controlling section 17 stops operation for transmission to the display apparatus 2 (S12) when the user manipulates a clear key on the operation panel.

If the transmission is OK, the user mounts a document on the scanner 10 (S5). When a start button is manipulated (S6), the scanner 10 operates to read an image of the document (S7). In this case, the control section 17 instructs the scanner 10 to read the image according to the display conditions. The scanner 10 reads the image in a color mode, the reading resolution, the reading size and the reading magnification depending on the display conditions. The control section 17 stores the image in the image memory 15. The image is different from the original image.

When the image reading finishes (S8), the control section 17 checks whether to allow enlarged display based on the display conditions (S9). If enlarged display is not allowed, the controlling section 17 attaches an image to be outputted with information of prohibition of enlarged display (S10). If enlarged display is allowed, no information is attached. Then, the control section 17 transmits an image restricted by editing to the designated display apparatus 2 (S11).

If the display apparatus 2 receives the image from the image processing apparatus 1, the control section 36 outputs the image to the display control section 33. The display control section 33 drives the display panel 30 so that the display panel 30 displays the image.

Alternatively, when the apparatus receives the image, the control section 36 displays annunciation of the reception of the image on the display panel 30. When a user in the installation location manipulates the touch panel 31 for display, the control section 36 displays the image. If enlarged display is allowed, the control section 36 displays the enlarged image.

The image to be displayed is different from the original image. If the security level for the installation location is low, then the degree of change in the image to be displayed is high, such as a decreased image quality, hence the image is not fine. As such, a user who watches the display apparatus 2 cannot clearly recognize confidential information even of an image containing the confidential information. Therefore, leakage of confidential information can be prevented. However, the user on the installation location can gain the minimum necessary information from the displayed image.

In the above display system, each of the image processing apparatuses 1 and the information processing apparatuses 3 retains and separately manages display apparatus information containing display conditions. As such, a particular one of the image processing apparatuses 1 manages the display apparatus information in an integrated fashion. The particular one of the image processing apparatuses 1 may be the information processing apparatus 3. The other image processing apparatuses 1 or the information processing apparatuses 3 requests the display apparatus information from the particular one of image processing apparatuses 1 when necessary. The particular one of image processing apparatuses 1 transmits the display apparatus information to the requesting image processing apparatus 1. The other image processing apparatuses 1 can obtain the display apparatus information and can restrict an image to be outputted based on the information. In this way, the display apparatus information is managed in an integrated fashion so that the display apparatus information is easily maintained. Additionally, each of the image processing apparatuses 1 can use the latest display apparatus information.

It is needless to say that the present invention is not limited to the above embodiment, but many modifications and changes can be added to the above embodiment within the scope of the present invention. The display apparatus can also use a plasma display or an organic EL display.

The information processing apparatus may restrict an image to be outputted according to display conditions and output the image to the display apparatus. That is, the control section of the information processing apparatus has an image editing function similarly to the control section of the image processing apparatus.

Display conditions can be modifiable. When a user confirms display conditions, an image to be outputted may be strictly restricted by modifying the display conditions if the image editing has a problem.

To determine display conditions, the display conditions may be determined by considering not only the security level for an installation location but also the security level for an image. An image containing confidential information is on a high security level. If the security level for an installation location is high and the security level for an image is high, display conditions are determined such that an image to be outputted is strictly restricted. In such case, when the image is outputted, the control section of the image processing apparatus or the information processing apparatus determines display conditions depending on the security level for the installation location and the security level for the image. This can ensure that a different image from the original image is displayed when an image containing confidential information is displayed, thus improving the security and preventing leakage of the confidential information.

The display apparatus is installed in each room and a security level is set for each room. However, the present invention is not limited to it, but a security level can be set by identifying an installation location of the display apparatus. In such case, the display apparatus transmits information of the installation location to the image processing apparatus. The image processing apparatus can identify the installation location.

For example, if the display apparatus is installed on a public area, the security level is set to low. If the display apparatus is moved for use, the security level is set depending on the destination. This allows to modify display conditions depending on a purpose of use on an installation location of the display apparatus, thus preventing display of an image containing confidential information.

The display apparatus can also determines display conditions by recognizing the installation location of the own apparatus. The display apparatus transmits the determined display conditions to the image processing apparatus. The image processing apparatus registers the display conditions in the display apparatus information table. When the display apparatus is moved, the display apparatus information table can be immediately updated so that the latest display apparatus information can be used.

What is claimed is:

1. A display system comprising:
   image processing apparatuses for processing images; and
   display apparatuses for displaying images;
   wherein the image processing apparatuses and the display apparatuses are connected through a network and the display apparatuses display the images outputted from the image processing apparatuses, the display apparatuses having a function to enlarge and display the image, a security level is set for installation locations where the display apparatuses are installed, the image processing apparatuses determine display conditions, including whether to allow an enlarged image display, depending on the security level of, and a display ability of, the display apparatuses installed at each installation location, and
   restrict images to be outputted according to the determined display conditions, the display apparatuses, when set to allow an enlarged display, attach no information of prohibition of enlarged display to the image to be outputted and display an enlarged image, and the display apparatuses, when set not to allow enlarged display, attach information of prohibition of enlarged display to an image to be outputted and display the restricted images.

2. The display system according to claim 1,
   wherein the display apparatuses are installed at different locations and the image processing apparatuses output the images restricted respectively for each of the display apparatuses.

3. The display system according to claim 2, wherein the image processing apparatuses are connected to the network, and a particular one of the image processing apparatuses manages the display conditions on all of the display apparatuses.

4. The display system according to claim 1, wherein the image processing apparatuses output images that have been edited so as to be different from original images according to display conditions, and the display apparatuses display the edited images.

5. The display system according to claim 1, wherein the image processing apparatuses judge whether to allow output of images based on the display conditions, and prohibit the image output if the output is not allowed.

* * * * *